(12) United States Patent
Moreno

(10) Patent No.: US 10,654,536 B1
(45) Date of Patent: May 19, 2020

(54) FOLDING DIRT BIKE STAND

(71) Applicant: Kenneth Moreno, Houston, TX (US)

(72) Inventor: Kenneth Moreno, Houston, TX (US)

(*) Notice: Subject to any disclaimer, the term of this patent is extended or adjusted under 35 U.S.C. 154(b) by 0 days.

(21) Appl. No.: 16/459,721

(22) Filed: Jul. 2, 2019

(51) Int. Cl.
B62H 3/10 (2006.01)
B62H 1/02 (2006.01)
B62H 1/08 (2006.01)

(52) U.S. Cl.
CPC .............. *B62H 3/10* (2013.01); *B62H 1/02* (2013.01); *B62H 1/08* (2013.01)

(58) Field of Classification Search
CPC ... B62H 3/10; B62H 1/00; B62H 1/02; B62H 1/04; B62H 1/06; B62H 1/08; B62H 1/10; B62H 2003/005; B62H 3/00; B62H 3/04; B62H 3/06; B62H 3/08; B62H 2700/00; B62H 2700/005; B62H 7/00; B60R 9/10; B25H 1/0014; A47F 10/04
USPC ................. 211/17, 21, 20, 22, 5; 224/42.13; D12/115, 120; 280/293, 298, 299, 300, 280/301, 302, 303, 304
See application file for complete search history.

(56) References Cited

U.S. PATENT DOCUMENTS

| 322,057 A * | 7/1885 | Hart ........................ B62H 3/04 211/21 |
| 350,990 A | 10/1886 | Philbrick |
| 556,758 A * | 3/1896 | Lefebre, Jr. .............. B62H 3/08 211/22 |
| 590,769 A * | 9/1897 | Pearsons ................. B62H 3/00 211/22 |
| 598,547 A * | 2/1898 | White ...................... B62H 3/04 211/21 |
| 762,558 A * | 6/1904 | Rhodes .................... B62H 1/02 280/301 |
| 1,207,327 A * | 12/1916 | Reid ........................ B62H 1/02 280/303 |
| 1,241,486 A * | 10/1917 | Armstrong .............. B62H 3/12 211/17 |
| 3,355,028 A * | 11/1967 | Mork ....................... B62H 3/06 211/21 |
| 4,180,253 A * | 12/1979 | Ivers ....................... B66F 15/00 211/22 |
| 4,348,010 A * | 9/1982 | Baxter ................... B66F 15/00 254/131 |
| 4,775,164 A * | 10/1988 | Jan .......................... B62H 1/02 254/133 R |
| 4,979,759 A * | 12/1990 | Solovay .................. B62H 3/10 211/17 |
| 5,211,376 A * | 5/1993 | Anderson ............ B25H 1/0014 254/134 |
| 5,222,707 A | 6/1993 | Myers |

(Continued)

FOREIGN PATENT DOCUMENTS

WO 1998031262 7/1998

*Primary Examiner* — Jennifer E. Novosad
(74) *Attorney, Agent, or Firm* — Kyle A. Fletcher, Esq.

(57) ABSTRACT

The folding dirt bike stand is configured for use with a cycle. The folding dirt bike stand is a collapsible stand. The folding dirt bike stand is a rotating stand. The folding dirt bike stand comprises a handle used to rotate the folding dirt bike stand. The folding dirt bike stand comprises a support frame, a pivot frame, and a plurality of hinged brackets. The plurality of hinged brackets attaches the pivot frame to the support frame such that the pivot frame rotates relative to the support frame. The support frame vertically supports the cycle.

18 Claims, 6 Drawing Sheets

(56) References Cited

U.S. PATENT DOCUMENTS

| | | | | |
|---|---|---|---|---|
| 5,234,225 | A * | 8/1993 | Yaple | B62H 1/04 280/293 |
| 5,497,967 | A | 3/1996 | Gantois | |
| 5,498,015 | A * | 3/1996 | Trout | B62H 3/00 211/22 |
| 5,518,224 | A * | 5/1996 | Anderson | B25H 1/0014 254/131 |
| 5,601,277 | A * | 2/1997 | Larson | B25H 1/0014 254/131 |
| 5,979,878 | A * | 11/1999 | Blankenship | B25H 1/0014 254/10 C |
| 6,050,546 | A * | 4/2000 | Peschmann | B66F 5/025 254/10 B |
| 6,092,787 | A * | 7/2000 | Nayman | B25H 1/0014 254/10 R |
| 6,341,763 | B1 * | 1/2002 | Lefebvre | B66F 15/00 254/131 |
| 6,464,207 | B2 * | 10/2002 | Creel | B25H 1/0014 254/10 C |
| 6,581,784 | B1 * | 6/2003 | Pino | B66F 15/00 211/22 |
| 6,742,798 | B2 * | 6/2004 | Berkmann | B62H 1/04 280/300 |
| 6,802,493 | B2 * | 10/2004 | Lance | B66F 15/00 254/120 |
| 6,868,976 | B1 * | 3/2005 | Lassanske | B62H 3/08 211/21 |
| 7,028,850 | B1 * | 4/2006 | Sargisian | B25H 1/0014 211/17 |
| 7,789,410 | B1 * | 9/2010 | White | B62H 3/10 211/21 |
| 8,066,235 | B1 * | 11/2011 | Evans | B25H 1/0014 108/116 |
| 8,360,252 | B1 * | 1/2013 | Fagan | B62H 3/10 211/21 |
| D718,193 | S | 11/2014 | Diorio | |
| 9,033,160 | B1 * | 5/2015 | Diorio | B62H 1/08 211/5 |
| 9,145,180 | B2 * | 9/2015 | Weeks | B62H 3/08 |
| 10,252,759 | B2 * | 4/2019 | Chuang | B62H 3/10 |
| 2002/0113230 | A1 * | 8/2002 | Creel | B25H 1/0014 254/131 |
| 2002/0117459 | A1 * | 8/2002 | Chen | B62H 3/00 211/20 |
| 2004/0216776 | A1 * | 11/2004 | Otis | A45B 1/02 135/85 |
| 2006/0163543 | A1 * | 7/2006 | Kobacker, II | B25H 1/0014 254/131 |
| 2008/0100030 | A1 * | 5/2008 | Brakhage | B62H 1/04 280/293 |
| 2009/0127522 | A1 * | 5/2009 | Sisson | B66F 15/00 254/91 |
| 2009/0256123 | A1 * | 10/2009 | Heck | B25H 5/00 254/131 |
| 2010/0201099 | A1 * | 8/2010 | Teng | B62H 1/02 280/294 |
| 2011/0220594 | A1 * | 9/2011 | Chuang | B62H 3/00 211/22 |
| 2012/0241392 | A1 * | 9/2012 | Combs | B60B 29/001 211/21 |
| 2015/0060636 | A1 * | 3/2015 | Erickson | B25H 1/0014 248/670 |
| 2017/0120974 | A1 * | 5/2017 | Peruzzo | B62H 3/08 |
| 2017/0174280 | A1 * | 6/2017 | Van Straaten | B62H 3/02 |
| 2018/0370588 | A1 * | 12/2018 | Chuang | B62H 3/10 |

\* cited by examiner

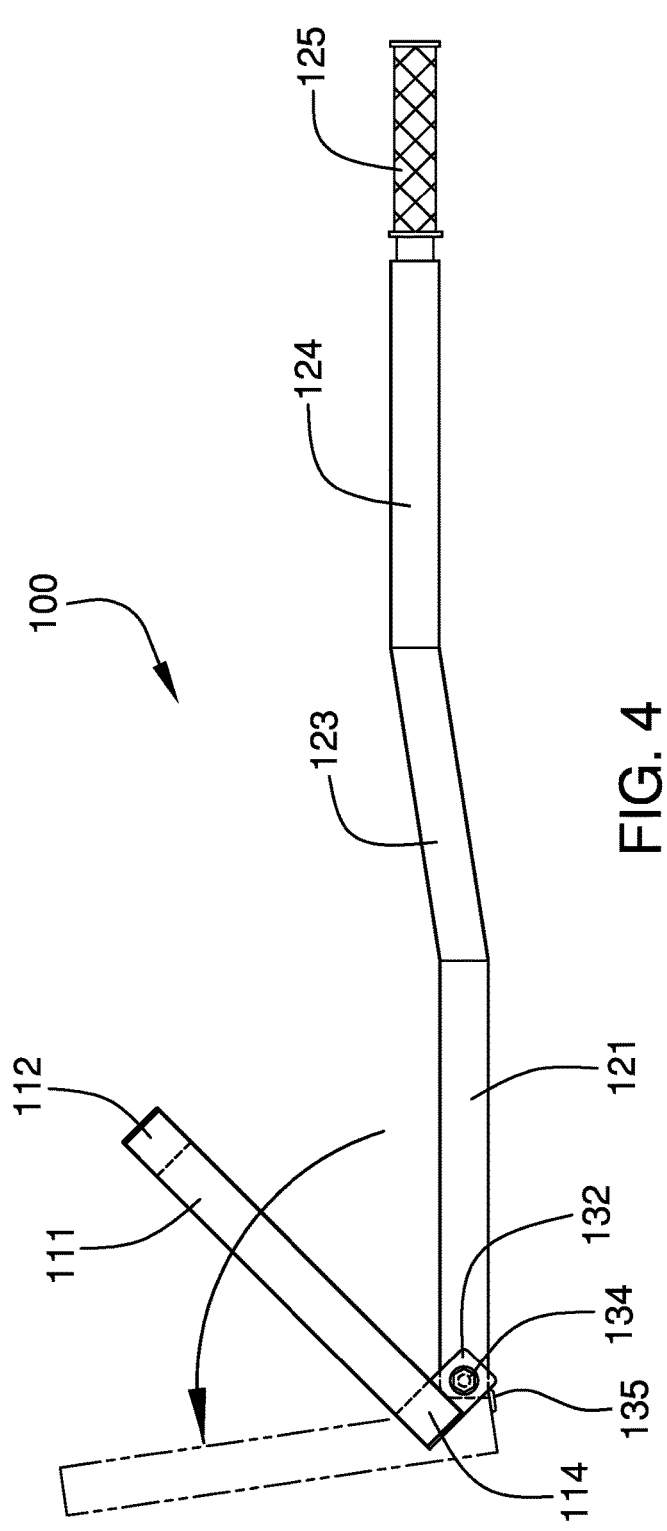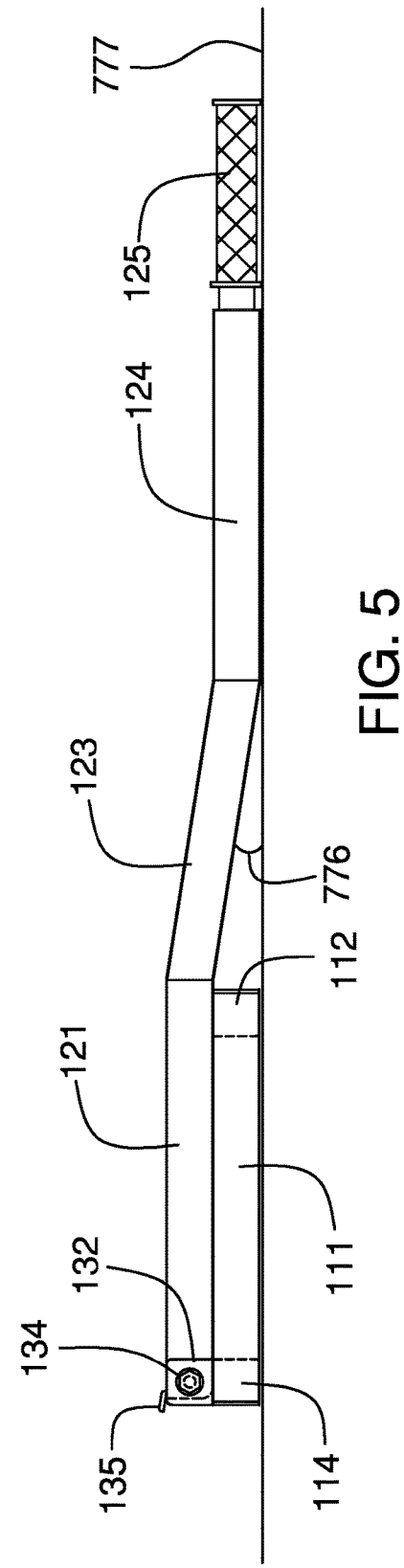

FOLDING DIRT BIKE STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including cycle stands, more specifically, a separate support for parking a cycle.

SUMMARY OF INVENTION

The folding dirt bike stand is configured for use with a cycle. The folding dirt bike stand is a collapsible stand. The folding dirt bike stand is a rotating stand. The folding dirt bike stand comprises a handle used to rotate the folding dirt bike stand. The folding dirt bike stand comprises a support frame, a pivot frame, and a plurality of hinged brackets. The plurality of hinged brackets attaches the pivot frame to the support frame such that the pivot frame rotates relative to the support frame. The support frame vertically supports the cycle.

These together with additional objects, features and advantages of the folding dirt bike stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the folding dirt bike stand in detail, it is to be understood that the folding dirt bike stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the folding dirt bike stand.

It is therefore important that the claims be regarded as including such equivalent construction insofar as they do not depart from the spirit and scope of the folding dirt bike stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a side view of a device of the disclosure.

FIG. 5 is another side view of a collapsed device of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
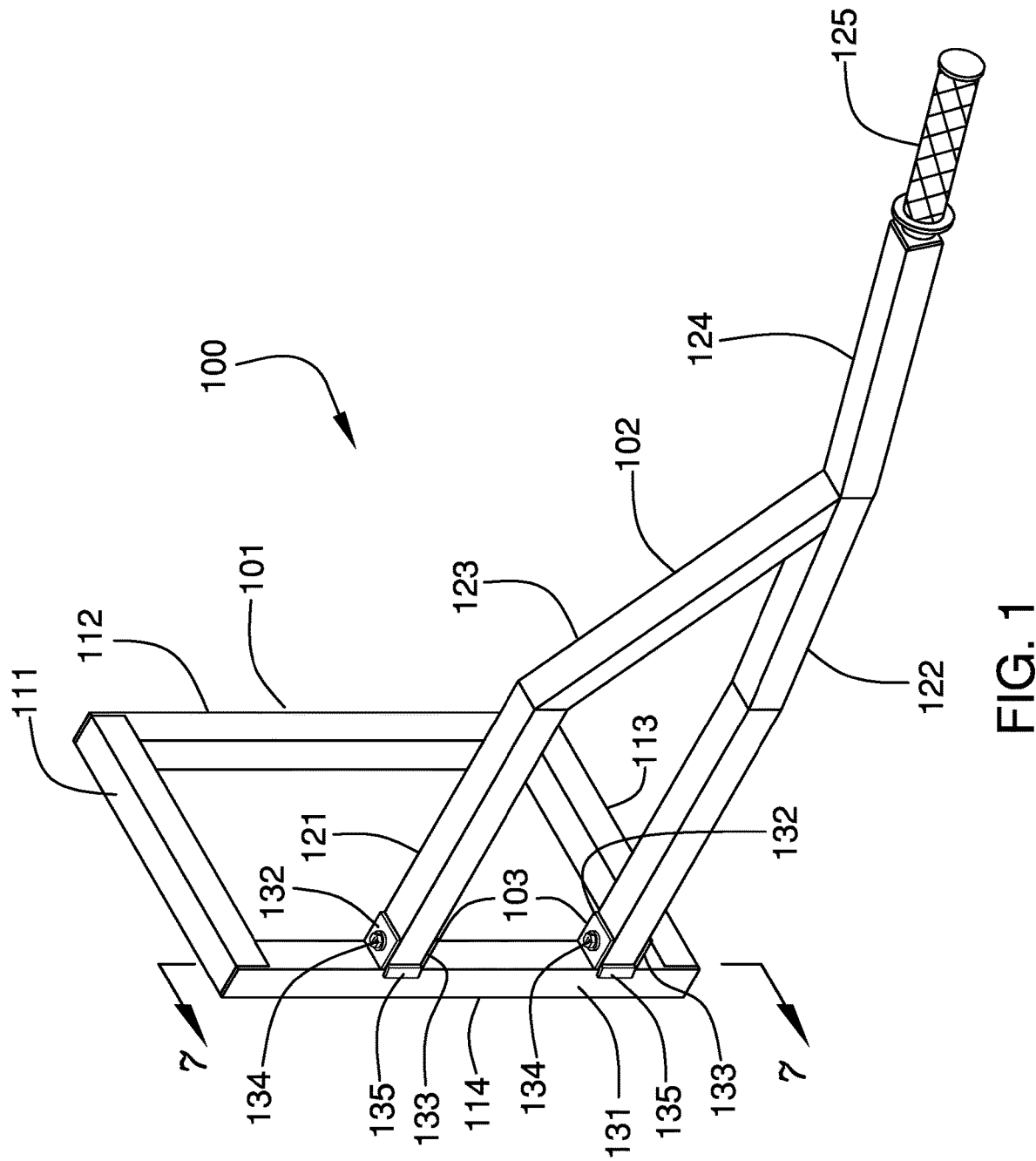
FIG. 1 is an extended perspective view of a device of the disclosure.
Figure 2:
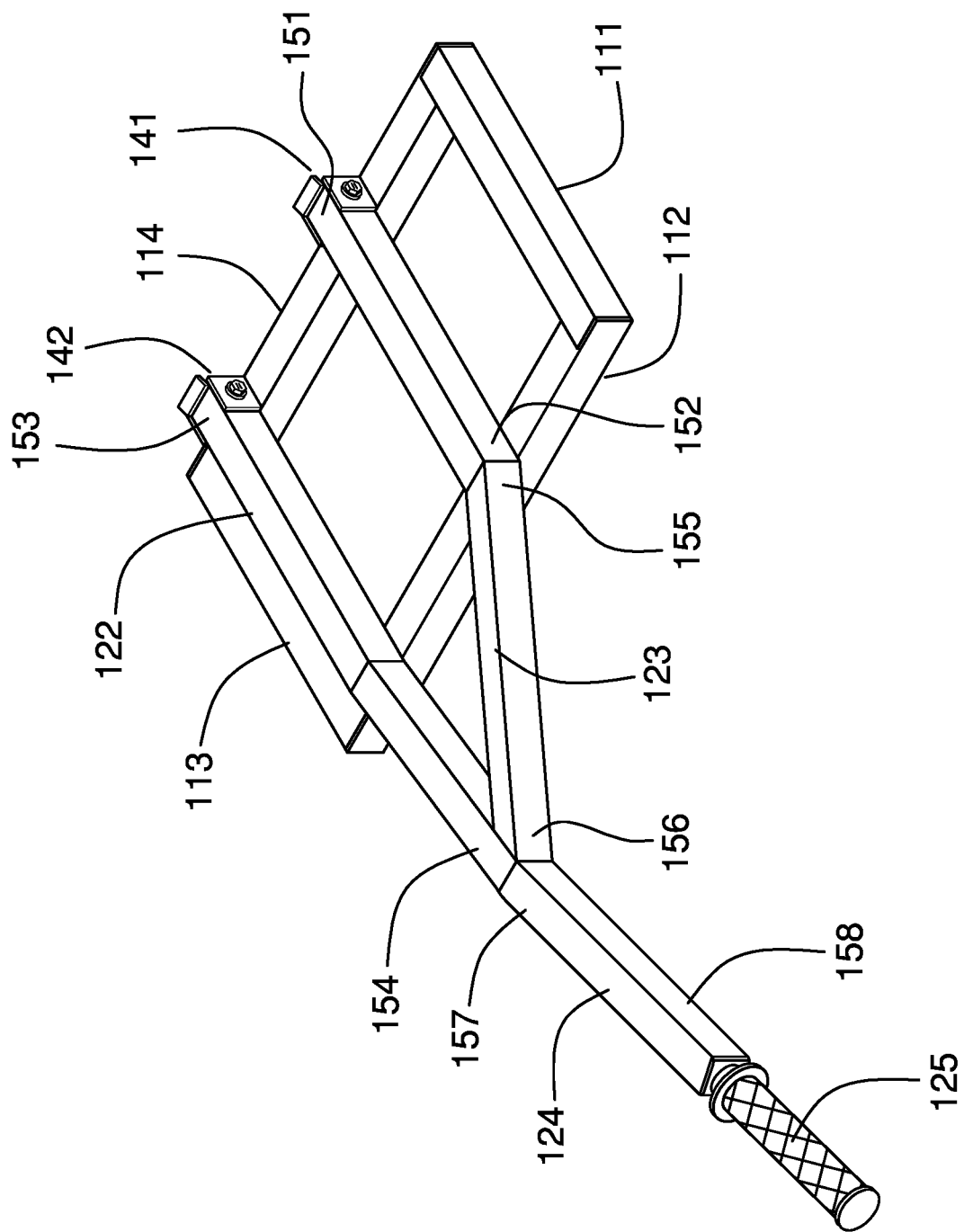
FIG. 2 is a collapsed perspective view of a device of the disclosure.
Figure 3:
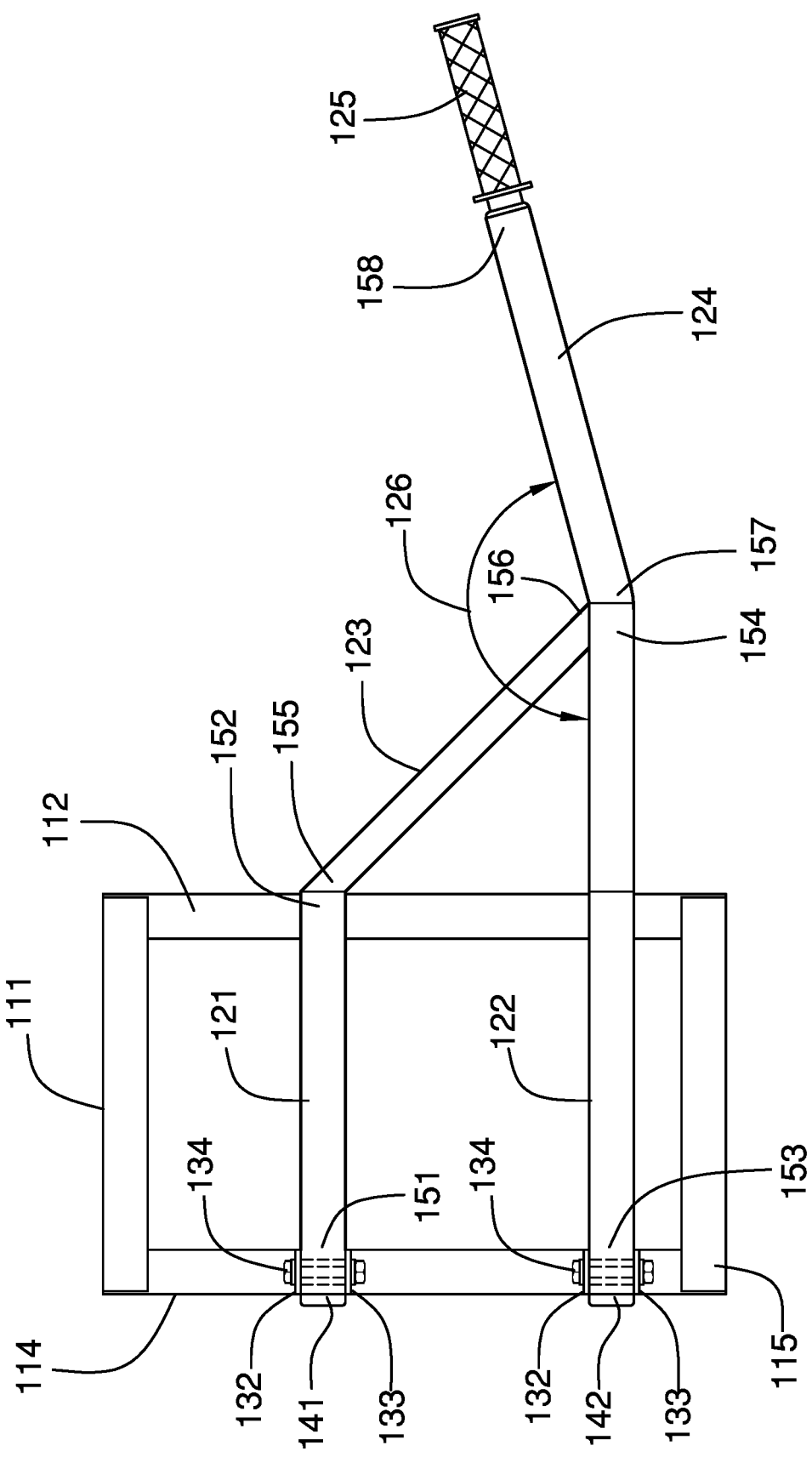
FIG. 3 is a front view of a device of the disclosure.
Figure 6:
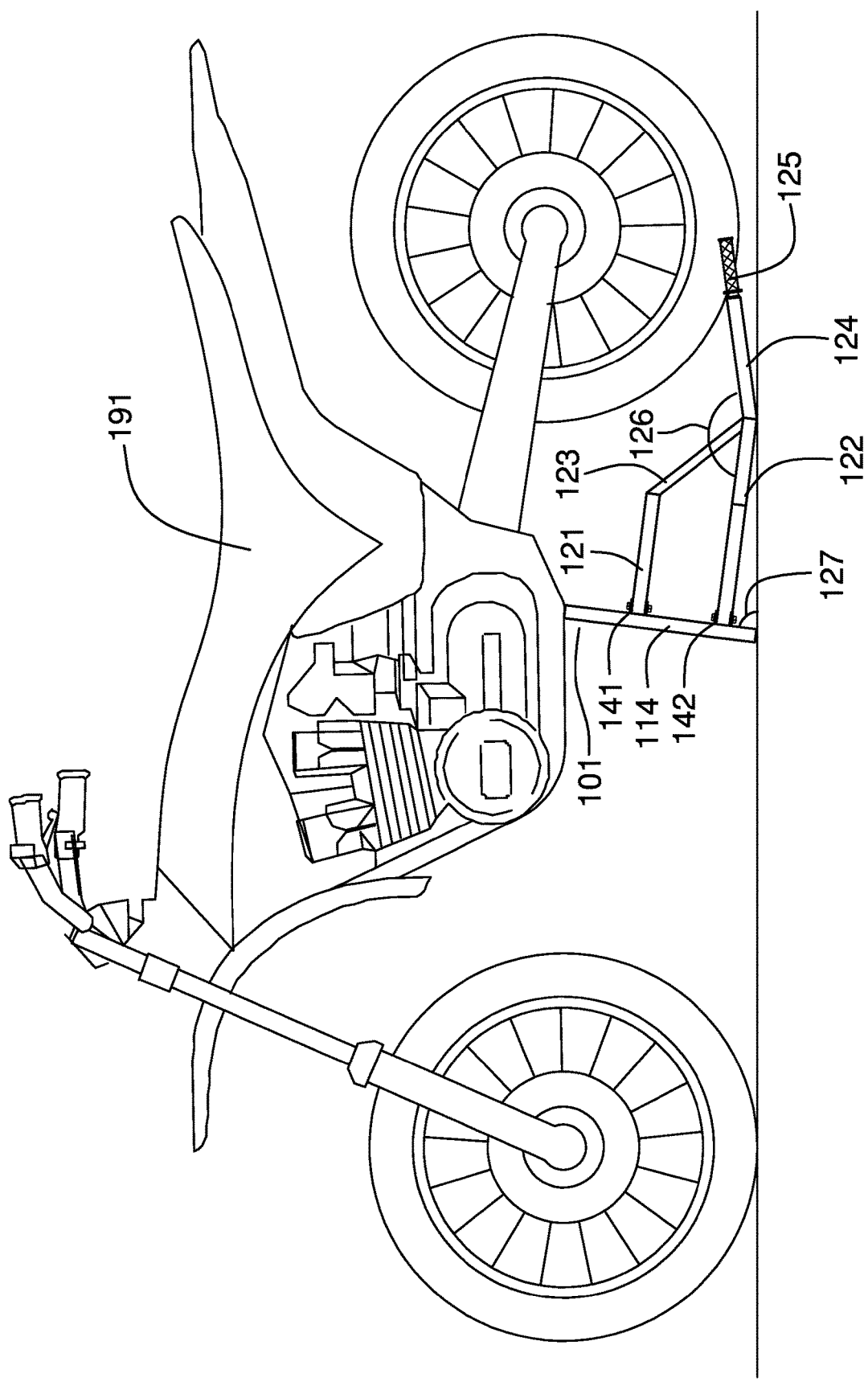
FIG. 6 is a side, in-use view of a device of the disclosure.
Figure 7:
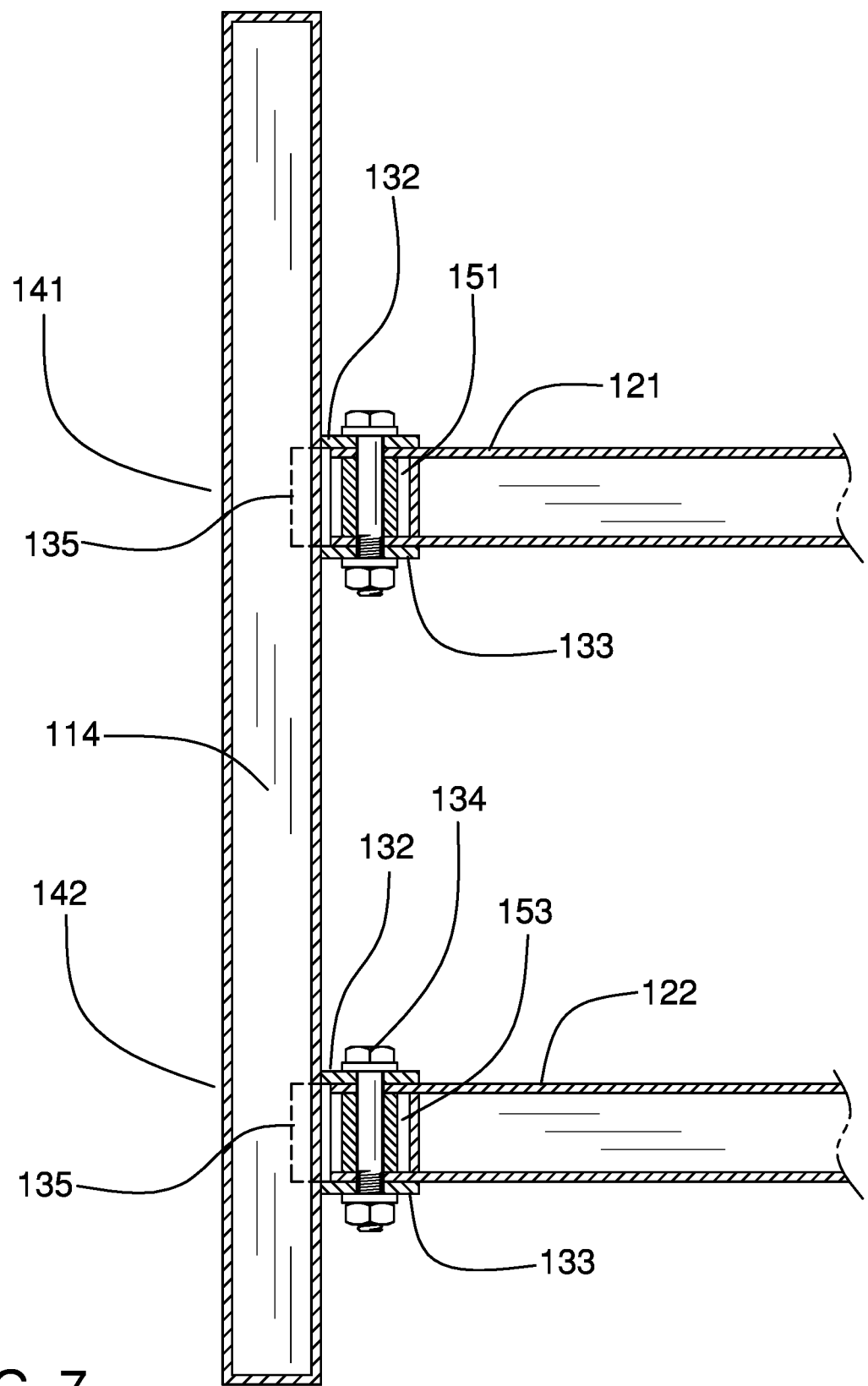
FIG. 7 is a cross-sectional view of the device of the disclosure across 7-7 as shown in FIG. 1.

Detailed reference will now be made to one or more potential embodiments of the disclosure, which are illustrated in FIGS. 1 through 7.

The folding dirt bike stand 100 (hereinafter invention) is configured for use with a cycle 191. The invention 100 is a collapsible stand. The invention 100 is a rotating stand. The invention 100 comprises a handle 125 used to rotate the invention 100. The invention 100 comprises a support frame 101, a pivoting frame 102, and a plurality of hinged brackets 103. The plurality of hinged brackets 103 attaches the pivoting frame 102 to the support frame 101 such that the pivoting frame 102 rotates relative to the support frame 101. The support frame 101 vertically supports the cycle 191.

The support frame 101 is a vertically oriented support structure. The support frame 101 prevents forward or rearward motion of the cycle 191 while the invention 100 is in use. The support frame 101 is a rectangular openwork structure. The support frame 101 comprises a first support shaft 111, a second support shaft 112, a third support shaft 113, and a fourth support shaft 114. The pivoting frame 102 defines a support angle 127 in the support frame 101. The support angle 127 is described in greater elsewhere in this disclosure.

The first support shaft 111 is a metal prism-shaped shaft. The first support shaft 111 is the shaft selected from the group consisting of the first support shaft 111, the second support shaft 112, the third support shaft 113, and the fourth support shaft 114 that has the center axis with the shortest span of length The fourth support shaft 114 is a metal prism-shaped shaft. The fourth support shaft 114 is the shaft selected from the group consisting of the first support shaft 111, the second support shaft 112, the third support shaft 113, and the fourth support shaft 114 that has the center axis with the greatest span of length.

The second support shaft 112 is a metal prism-shaped shaft. The second support shaft 112 is the shaft selected from the group consisting of the first support shaft 111, the second support shaft 112, the third support shaft 113, and the fourth support shaft 114 that is distal to the fourth support shaft 114. The span of the length of the center axis of the second support shaft 112 equals the span of the length of the center axis of the fourth support shaft 114.

The third support shaft 113 is a metal prism-shaped shaft. The third support shaft 113 is the shaft selected from the group consisting of the first support shaft 111, the second support shaft 112, the third support shaft 113, and the fourth support shaft 114 that is distal to the first support shaft 111. The span of the length of the center axis of the third support shaft equals the span of the length of the center axis of the first support shaft 111.

The pivoting frame 102 is a horizontally oriented support structure. The pivoting frame 102 prevents motion of the cycle 191 along the primary sense of direction of the cycle 191 while the invention 100 is in use. The pivoting frame 102 is a rectilinear openwork structure. The pivoting frame 102 attaches to the support frame 101 such that the pivoting frame 102 rotates relative to the support frame 101. The pivoting frame 102 comprises a superior shaft 121, an inferior shaft 122, a gusset shaft 123, a cant shaft 124, and a handle 125.

The superior shaft 121 is further defined with a first end 151 and a second end 152. The inferior shaft 122 is further defined with a third end 153 and a fourth end 154. The gusset shaft 123 is further defined with a fifth end 155 and a sixth end 156. The cant shaft 124 is further defined with a seventh end 157 and an eighth end 158. The inferior shaft 122 and the cant shaft 124 are joined to form a cant angle 126.

The superior shaft 121 is a metal prism-shaped shaft. The superior shaft 121 attaches to the fourth support shaft 114 of the support frame 101 such that the superior shaft 121 rotates between a perpendicular and parallel position relative to the pivoting frame 102.

The inferior shaft 122 is a metal prism-shaped shaft. The inferior shaft 122 attaches to the fourth support shaft 114 of the support frame 101 such that the inferior shaft 122 rotates between a perpendicular and parallel position relative to the pivoting frame 102.

The gusset shaft 123 is a metal prism-shaped shaft. The gusset shaft 123 attaches to the superior shaft 121 such that the center axis of the gusset shaft 123 forms neither a parallel or perpendicular angle to the center axis of the superior shaft 121. The gusset shaft 123 attaches to the inferior shaft 122 such that the center axis of the gusset shaft 123 forms neither a parallel or perpendicular angle to the center axis of the inferior shaft 122.

The cant shaft 124 is a metal prism-shaped shaft. The cant shaft 124 attaches to the inferior shaft 122 such that the center axis of the cant shaft 124 forms neither a parallel or perpendicular angle to the center axis of the inferior shaft 122.

The handle 125 is a grip that attaches to the cant shaft 124. The handle 125 allows for the manipulation of the pivoting frame 102.

The angle between the center axis of the inferior shaft 122 and the center axis of the cant shaft 124 is the cant angle 126. The cant angle 126 formed between the cant shaft 124 and the inferior shaft 122 is between 90 degrees and 180 degrees. The support angle 127 refers to an acute angle formed between the fourth support shaft 114 and the supporting surface when the invention 100 is used normally. The pivoting frame 102 is assembled such that the span of the support angle 127 equals the span of the cant angle 126 less 90 degrees.

The plurality of hinged brackets 103 attaches the pivoting frame 102 to the support frame 101 such that the pivoting frame 102 rotates relative to the support frame 101. Each of the plurality of hinged brackets 103 is a rotating mechanical structure. Each of the plurality of hinged brackets 103 is identical. Each of the plurality of hinged brackets 103 attaches a shaft selected from the group consisting of the superior shaft 121 and the inferior shaft 122 to the fourth support shaft 114 of the support frame 101. The plurality of hinged brackets 103 comprises a collection of individual brackets 131. Each individual bracket 131 selected from the plurality of hinged brackets 103 is identical.

The individual bracket 131 is a rotating mechanical structure. Each individual bracket 131 attaches a shaft selected from the group consisting of the superior shaft 121 and the inferior shaft 122 to the fourth support shaft 114 of the support frame 101 such that the selected shaft will rotate relative to the support frame 101. Each individual bracket 131 further comprises a superior plate 132, an inferior plate 133, a pivot bolt 134, and a stop plate 135.

The superior plate 132 is a nut. The inner diameter of the superior plate 132 is sized to receive the pivot bolt 134 such that the pivot bolt 134 rotates freely within the superior plate 132. The superior plate 132 attaches to the fourth support shaft 114 of the support frame 101 such that the faces of the superior plate 132 are perpendicular to the center axis of the fourth support shaft 114.

The inferior plate 133 is a nut. The inner diameter of the inferior plate 133 is sized to receive the pivot bolt 134 such that the pivot bolt 134 rotates freely within the inferior plate 133. The inferior plate 133 attaches to the fourth support shaft 114 of the support frame 101 such that the faces of the inferior plate 133 are perpendicular to the center axis of the fourth support shaft 114.

Neither the superior plate 132 nor the inferior plate 133 are configured to form a threaded connection with the pivot bolt 134.

The pivot bolt 134 is a cylindrical metal structure. The pivot bolt 134 inserts through the superior plate 132 and the inferior plate 133 such that the superior plate 132 and the inferior plate 133 can rotate around the pivot bolt 134. The pivot bolt 134 forms the pivot of a hinge that allows the pivoting frame 102 to rotate relative to the support frame 101.

The stop plate 135 is a stop motion structure. The stop plate 135 mounts on the individual bracket 131 such that the range of rotation of the individual bracket 131 is limited by the stop plate 135.

The plurality of hinged brackets 103 comprises a superior bracket 141 and an inferior bracket 142. The superior bracket 141 is a bracket selected from the plurality of hinged brackets 103 that attaches the superior shaft 121 to the fourth support shaft 114 of the support frame 101. The inferior bracket 142 is a bracket selected from the plurality of hinged brackets 103 that attaches the inferior shaft 122 to the fourth support shaft 114 of the support frame 101. The superior bracket 141 mounts on the fourth support shaft 114 in a superior position relative to the inferior bracket 142 when the invention 100 is used normally.

This paragraph describes the assembly of the invention 100. The superior bracket 141 attaches the first end 151 of the superior shaft 121 to the fourth support shaft 114 of the support frame 101. The inferior bracket 142 attaches the third end 153 of the inferior shaft 122 to the fourth support shaft 114 of the support frame 101. The fifth end 155 of the gusset shaft 123 attaches to the second end 152 of the superior shaft 121. The sixth end 156 of the gusset shaft 123 attaches to the fourth end 154 of the inferior shaft 122. The seventh end 157 of the cant shaft 124 attaches to the fourth end 154 of the inferior shaft 122. The handle 125 attaches to the eighth end 158 of the cant shaft 124.

Referring to FIG. 5, the invention 100 can lie flat when not in use. The support frame 101 is rotated to lie against the superior shaft 121. Moreover, the gusset shaft 123 has a lie angle 776, which enables the invention 100 to lie flat on a support surface 777.

The following definitions were used in this disclosure:

Bicycle: As used in this disclosure, a bicycle is a commercially available vehicle with two wheels. The bicycle is a self-powered vehicle intended for carrying one or two passengers.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can be superimposed over the second object such that the first object aligns, within manufacturing tolerances, with second object.

Correspond: As used in this disclosure, the term correspond is used as a comparison between two or more objects wherein one or more properties shared by the two or more objects match, agree, or align within acceptable manufacturing tolerances.

Cycle: As used in this disclosure, a cycle refers to a device selected from the group consisting of a bicycle and a motorcycle.

Disk: As used in this disclosure, a disk is a prism-shaped object that is flat in appearance. In this disclosure, the surface area of the ends of the prism-shaped object that forms the disk is greater than the lateral face of the prism-shaped object that forms the disk. In this disclosure, the ends of the prism-shaped structure that forms the disk are referred to as the faces of the disk.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gusset: As used in this disclosure, a gusset is an angled structural member used to form a portion of the load path of a section of a framework. By angled is meant that the gusset is neither parallel nor perpendicular to the force of gravity.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motorcycle: As used in this disclosure, a motorcycle is a commercially available motorized vehicle with wheels that is intended for carrying one or more passengers.

Mount: As used in this disclosure, a mount is a load-bearing mechanical structure that attaches a first object to a second object.

Nut: As used in this disclosure, a nut is a prism-shaped disk formed with a cylindrical negative space that allows a shaft to insert through the faces of the disk. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term open work is used to describe a structure, often a surface, which is formed with openings that allow for visibility and fluid flow through the structure. Wrought work and meshes are forms of openwork.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Shaft: As used in this disclosure, a shaft is a long, narrow and rigid prism structure that is used as: 1) a structural element of a larger object; or 2) as a grip or lever for a handle. Shafts often have a cylindrical shape.

Stop Motion: As used in this disclosure, a stop motion is a second device that limits the range of a first object. The range of the first object is selected from the group consisting of a range of motion or a range of rotation.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A support for parking a cycle comprising:
   wherein the support for parking a cycle comprises a handle;
   a support frame, a pivoting frame, and a plurality of hinged brackets;
   wherein the plurality of hinged brackets attaches the pivoting frame to the support frame such that the pivoting frame rotates relative to the support frame;
   wherein the support for parking a cycle is configured for use with a cycle;
   wherein the cycle is further defined with a primary sense of direction;
   wherein the support for parking a cycle is a collapsible stand;
   wherein the support for parking a cycle is a rotating stand;
   wherein the support frame vertically supports the cycle;
   wherein the pivoting frame horizontally supports the cycle;
   wherein the support frame is a vertically oriented support structure;
   wherein the support frame is a rectangular openwork structure;
   wherein the support frame prevents forward or rearward motion of the cycle;
   wherein the pivoting frame is a horizontally oriented support structure;
   wherein the pivoting frame prevents motion of the cycle along the primary sense of direction of the cycle;
   wherein the pivoting frame is a rectilinear openwork structure;
   wherein the pivoting frame attaches to the support frame such that the pivoting frame rotates relative to the support frame;
   wherein the plurality of hinged brackets attaches the pivoting frame to the support frame such that the pivoting frame rotates relative to the support frame;
   wherein each of the plurality of hinged brackets is a rotating mechanical structure;
   wherein each of the plurality of hinged brackets is identical;
   wherein the pivoting frame creates a support angle between the support frame and a supporting surface;
   wherein the support angle is an acute angle.

2. The support for parking a cycle according to claim 1
wherein the support frame comprises a first support shaft, a second support shaft, a third support shaft, and a fourth support shaft;
wherein the first support shaft, the second support shaft, the third support shaft, and the fourth support shaft are interconnected;
wherein the first support shaft is a metal prism-shaped shaft;
the second support shaft is a metal prism-shaped shaft;
the fourth support shaft is a metal prism-shaped shaft;
wherein the third support shaft is a metal prism-shaped shaft.

3. The support for parking a cycle according to claim 2
wherein the first support shafts has the center axis with the shortest span of length;
wherein the fourth support shaft has the center axis with the greatest span of length;
wherein the second support shaft is distal to the fourth support shaft;
wherein the third support shaft is distal to the first support shaft.

4. The support for parking a cycle according to claim 3 wherein the span of the length of the center axis of the second support shaft equals the span of the length of the center axis of the fourth support shaft.

5. The support for parking a cycle according to claim 4 wherein the span of the length of the center axis of the third support shaft equals the span of the length of the center axis of the first support shaft.

6. The support for parking a cycle according to claim 5
wherein the pivoting frame comprises a superior shaft, an inferior shaft, a gusset shaft, a cant shaft, and the handle;
wherein the superior shaft, the inferior shaft, the gusset shaft, the cant shaft, and the handle are interconnected;
wherein the superior shaft is further defined with a first end and a second end;
wherein the inferior shaft is further defined with a third end and a fourth end;
wherein the gusset shaft is further defined with a fifth end and a sixth end;
wherein the cant shaft is further defined with a seventh end and an eighth end.

7. The support for parking a cycle according to claim 6
wherein the inferior shaft and the cant shaft are joined to form a cant angle;
wherein the angle between the center axis of the inferior shaft and the center axis of the cant shaft is the cant angle.

8. The support for parking a cycle according to claim 7
wherein the superior shaft is a metal prism-shaped shaft;
wherein the inferior shaft is a metal prism-shaped shaft;
wherein the superior shaft attaches to the fourth support shaft of the support frame such that the superior shaft rotates between a perpendicular and parallel position relative to the pivoting frame;
wherein the inferior shaft attaches to the fourth support shaft of the support frame such that the inferior shaft rotates between a perpendicular and parallel position relative to the pivoting frame.

9. The support for parking a cycle according to claim 8
wherein the gusset shaft is a metal prism-shaped shaft;
wherein the gusset shaft attaches to the superior shaft such that the center axis of the gusset shaft forms neither a parallel or perpendicular angle to the center axis of the superior shaft;
wherein the gusset shaft attaches to the inferior shaft such that the center axis of the gusset shaft forms neither a parallel or perpendicular angle to the center axis of the inferior shaft.

10. The support for parking a cycle according to claim 9
wherein the cant shaft is a metal prism-shaped shaft;
wherein the cant shaft attaches to the inferior shaft such that the cant angle forms neither a parallel or perpendicular angle to the center axis of the inferior shaft.

11. The support for parking a cycle according to claim 10
wherein the handle is a grip;
wherein the handle attaches to the cant shaft.

12. The support for parking a cycle according to claim 11 wherein the cant angle formed between the cant shaft and the inferior shaft is between 90 degrees and 180 degrees.

13. The support for parking a cycle according to claim 12 wherein the pivoting frame is assembled such that the span of the support angle equals the span of the cant angle less 90 degrees.

14. The support for parking a cycle according to claim 13 wherein each of the plurality of hinged brackets attaches a shaft selected from the group consisting of the superior shaft and the inferior shaft to the fourth support shaft of the support frame.

15. The support for parking a cycle according to claim 14
wherein the plurality of hinged brackets comprises a collection of individual brackets;
wherein each individual bracket selected from the plurality of hinged brackets is identical;
wherein the individual bracket is a rotating mechanical structure;
wherein each individual bracket attaches a shaft selected from the group consisting of the superior shaft and the inferior shaft to the fourth support shaft of the support frame such that the selected shaft will rotate relative to the support frame.

16. The support for parking a cycle according to claim 15
wherein each individual bracket further comprises a superior plate, an inferior plate, a pivot bolt, and a stop plate;
wherein the superior plate is a nut;
wherein the inferior plate is a nut;
wherein the pivot bolt is a cylindrical metal structure;
wherein the stop plate is a stop motion structure;
wherein the inner diameter of the superior plate is sized to receive the pivot bolt such that the pivot bolt rotates freely within the superior plate;
wherein the inner diameter of the inferior plate is sized to receive the pivot bolt such that the pivot bolt rotates freely within the inferior plate;
wherein the superior plate attaches to the fourth support shaft of the support frame such that the faces of the superior plate are perpendicular to the center axis of the fourth support shaft;
wherein the inferior plate attaches to the fourth support shaft of the support frame such that the faces of the inferior plate are perpendicular to the center axis of the fourth support shaft;
wherein the pivot bolt inserts through the superior plate and the inferior plate such that the superior plate and the inferior plate can rotate around the pivot bolt;
wherein the pivot bolt forms a pivot allows the pivoting frame to rotate relative to the support frame;
wherein the stop plate mounts on the individual bracket such that the range of rotation of the individual bracket is limited by the stop plate.

17. The support for parking a cycle according to claim 16 wherein the plurality of hinged brackets comprises a superior bracket and an inferior bracket;
wherein the superior bracket is a bracket selected from the plurality of hinged brackets that attaches the superior shaft to the fourth support shaft of the support frame;
wherein the inferior bracket is a bracket selected from the plurality of hinged brackets that attaches the inferior shaft to the fourth support shaft of the support frame;
wherein the superior bracket mounts on the fourth support shaft in a superior position relative to the inferior bracket.

18. The support for parking a cycle according to claim 17 wherein the superior bracket attaches the first end of the superior shaft to the fourth support shaft of the support frame;
wherein the inferior bracket attaches the third end of the inferior shaft to the fourth support shaft of the support frame;
wherein the fifth end of the gusset shaft attaches to the second end of the superior shaft;
wherein the sixth end of the gusset shaft attaches to the fourth end of the inferior shaft;
wherein the seventh end of the cant shaft attaches to the fourth end of the inferior shaft;
wherein the handle attaches to the eighth end of the cant shaft.

* * * * *